US012803392B2

(12) United States Patent
Drexler et al.

(10) Patent No.: US 12,803,392 B2
(45) Date of Patent: Nov. 17, 2026

(54) ELECTRIC MOTOR WITH ANGLE SENSOR, E.G., HOLLOW SHAFT ENCODER

(71) Applicant: SEW-EURODRIVE GMBH & CO. KG, Bruchsal (DE)

(72) Inventors: Mario Drexler, Ubstadt-Weiher (DE); Michael Riffel, Forst (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 131 days.

(21) Appl. No.: 19/108,945

(22) PCT Filed: Jul. 25, 2023

(86) PCT No.: PCT/EP2023/070618
§ 371 (c)(1),
(2) Date: Mar. 5, 2025

(87) PCT Pub. No.: WO2024/052001
PCT Pub. Date: Mar. 14, 2024

(65) Prior Publication Data
US 2026/0142537 A1 May 21, 2026

(30) Foreign Application Priority Data
Sep. 6, 2022 (DE) ......................... 102022003276.7

(51) Int. Cl.
*H02K 11/21* (2016.01)
*G01B 21/22* (2006.01)
*H02K 7/00* (2006.01)

(52) U.S. Cl.
CPC ............. *H02K 11/21* (2016.01); *G01B 21/22* (2013.01); *H02K 7/003* (2013.01)

(58) Field of Classification Search
CPC ........ H02K 11/21; H02K 7/003; G01B 21/22; F16D 1/068; F16D 1/12
(Continued)

(56) References Cited

U.S. PATENT DOCUMENTS

2026/0142537 A1* 5/2026 Drexler .................. H02K 11/21

FOREIGN PATENT DOCUMENTS

CN 202260875 U 5/2012
CN 210638719 * 5/2020
(Continued)

OTHER PUBLICATIONS

International Report on Patentability issued in corresponding International Application No. PCT/EP2023/070618, dated Mar. 1, 2025, pp. 1-9, English Translation.
(Continued)

*Primary Examiner* — Ahmed Elnakib
(74) *Attorney, Agent, or Firm* — Carter, DeLuca & Farrell LLP

(57) ABSTRACT

An electric motor includes an angle sensor. A rotor shaft of the electric motor is connected to an attachment shaft, which includes a threaded region, a guide region, a cylindrical portion that effects a centering fit, a second non-circular portion, a connection region, and a first non-circular portion. The rotor shaft has a stepped bore, and the threaded region is screwed into an internally threaded region of the rotor shaft. A thread run-out region adjoins the internally threaded region of the rotor shaft. The guide region of the attachment shaft is received with play in the rotor shaft.

22 Claims, 4 Drawing Sheets

(58) Field of Classification Search
USPC ........................................................ 310/68 B
See application file for complete search history.

(56) References Cited

FOREIGN PATENT DOCUMENTS

| | | | | |
|---|---|---|---|---|
| CN | 119037374 | | * | 11/2024 |
| DE | 102008028658 | A1 | | 12/2009 |
| DE | 102013002049 | A1 | | 8/2014 |
| DE | 102015012796 | | * | 2/2017 |
| DE | 102015012796 | A1 | | 2/2017 |
| DE | 10-2019-002745 | | * | 11/2019 |
| DE | 102019002745 | A1 | | 11/2019 |

OTHER PUBLICATIONS

International Search Report issued in corresponding International Application No. PCT/EP2023/070618 dated Oct. 25, 2023, pp. 1-2, English Translation.

* cited by examiner

ELECTRIC MOTOR WITH ANGLE SENSOR, E.G., HOLLOW SHAFT ENCODER

FIELD OF THE INVENTION

The present invention relates to an electric motor with an angle sensor, e.g., a hollow shaft encoder.

BACKGROUND INFORMATION

An attachment shaft for connection to an angle sensor which is bonded to a rotor shaft of an electric motor and has a venting spiral groove is described in European Patent Document No. 2 999 094.

A sensor arrangement is described in German Patent Document No. 10 2013 002 049.

An electric motor and an angle sensor are described in German Patent Document No. 10 2019 002 745.

SUMMARY

Example embodiments of the present invention provide an electric motor that includes an angle sensor, e.g., a hollow shaft encoder, in which a high-precision but also readily removable connection of an angle sensor to an electric motor is provided.

According to example embodiments, in an electric motor with angle sensor, e. g., hollow shaft encoder, a rotor shaft of the electric motor is connected to an attachment shaft, e. g., connected for conjoint rotation. The attachment shaft has a threaded region, a guide region, a cylindrical portion that effects a centering fit, a second non-circular portion, a connection region, and a first non-circular portion. The rotor shaft has a stepped bore, and the threaded region is screwed into an internally threaded region of the rotor shaft. A thread run-out region adjoins the internally threaded region of the rotor shaft, e.g., on the side of the internally threaded region axially facing away from the guide region. The guide region of the attachment shaft is received with play in the rotor shaft, e.g., with a clearance fit. For example, the cylindrical portion that effects the centering fit has a larger outer diameter than the guide region.

An advantage of this is that the attachment shaft is screw-connected, and with a screw connection actuation is possible without transverse torque, since the first non-circular portion is readily accessible to a tool in the absence of an angle sensor and thus the attachment shaft can be screwed in without transverse force, i.e., with as little central torque as possible. A guide region for pre-centering is provided when the attachment shaft is inserted and when the attachment shaft is screwed further into the threaded bore a centering fit is activated and a stable, resilient connection is achieved through the threaded region. The attachment shaft is thus oriented with high precision to the rotor shaft, i.e., as precisely as possible in alignment with the rotor shaft.

The second non-circular portion provides for ready removing, as a high torque can be applied, which can even destroy an additional adhesive connection. This is because the second non-circular portion is radially much more extended than the first non-circular portion.

Thus, it is only possible to remove a fan that is fitted onto the rotor shaft if the attachment shaft is removed first. However, removing of the attachment shaft is simple and thus readily carried out. The attachment shaft can then be mounted again, but for this the adhesive residue must first be removed and fresh liquid adhesive must be applied to the threaded area and the guide region.

According to example embodiments, the attachment shaft is connected for conjoint rotation with a hollow shaft of the angle sensor. An advantage of this is that the hollow shaft is fitted onto the attachment shaft. A simple force-fit clamping connection is thus possible.

According to example embodiments, a cavity is formed axially between the guide region and the internally threaded region, e. g., to receive adhesive. An advantage of this is that adhesive squeezed out of the guide region or the threaded region when screwing in the attachment shaft can be received.

According to example embodiments, adhesive is arranged between the rotor shaft and the guide region. For example, adhesive escaping from the threaded region or guide region is located in an annular cavity which is delimited radially inwards by the threaded region and radially outwards by the stepped bore of the attachment shaft. An advantage of this is that the attachment shaft connection can be arranged to be as stable and resilient as possible.

According to example embodiments, adhesive is arranged between the internally threaded region and the threaded region. For example adhesive that has escaped from the threaded region is located in the thread run-out region. An advantage of this is that the attachment shaft connection can be arranged to be as stable and resilient as possible.

According to example embodiments, the guide region adjoins the cylindrical portion that effects the centering fit. An advantage of this is that when the attachment shaft is inserted, the guide section takes effect first and only then the centering fit.

According to example embodiments, the second non-circular portion is arranged axially between the cylindrical portion that effects the centering fit and the connection region. An advantage of this is that the second non-circular portion is arranged outside the stepped bore of the attachment shaft, but as close as possible to the adhesive connection.

According to example embodiments, the hollow shaft of the angle sensor is connected to the attachment shaft in the connection region, e.g., in a force-locking manner. An advantage of this is that a simple and highly precise centered connection of the hollow shaft of the angle sensor is possible, and the angle sensor detects the angular position of the hollow shaft in relation to the housing of the angle sensor.

According to example embodiments, an elastic ring, e.g., an O-ring, is arranged between the rotor shaft and the second non-circular portion. For example, the elastic ring is arranged radially outside the cylindrical portion that effects the centering fit. For example, the elastic ring bears against an end face, e. g., an axial end face, of the second non-circular portion facing away from the connection region and/or against an end face, e.g., an axial end face, of the rotor shaft facing the second non-circular portion. For example, the ring axis of the elastic ring is oriented parallel to the axis of rotation of the rotor shaft. An advantage of this is that axial shocks that are transmitted from the motor to the angle sensor are damped by the elastic ring. The elastic ring can also be made from a material such as Teflon, for example. The highest possible proportion of the impact energy is absorbed.

According to example embodiments, the first non-circular portion adjoins the connection region, e.g., on the side of the connection region axially facing away from the second non-circular portion. An advantage of this is that the first non-circular portion forms the axial end region of the attachment shaft and thus a torque can be applied centrally in the middle, i.e., without transverse torque, to screw the attachment shaft into the rotor shaft.

According to example embodiments, a fan is fitted onto the rotor shaft and connected for conjoint rotation with the rotor shaft, and the region covered by the fan in the axial direction overlaps with or includes the region covered by the internally threaded region and/or thread run-out region in the axial direction.

For example, fan blades are formed on the fan that are evenly spaced from one another in the circumferential direction. An advantage of this is that the fan can be removed when the attachment shaft is dismantled from the rotor shaft.

According to example embodiments, the clear inside diameter of the fan or the outside diameter of the rotor shaft in the region covered by the fan in the radial direction is smaller than the largest outside diameter of the second non-circular portion. An advantage of this is that the fan can also be dismantled after dismantling the attachment shaft.

According to example embodiments, the largest outer diameter of the second non-circular portion is larger than the largest outer diameter of the connection region and than the largest outer diameter of the first non-circular portion. An advantage of this is that a high torque can be applied, e.g., for removing the attachment shaft.

According to example embodiments, the first non-circular portion is an outer non-circular portion, e.g., an outer hexagonal portion, or an inner non-circular portion, e.g., an inner hexagonal portion. An advantage of this is that the torque can be introduced into the attachment shaft centrally, i.e., in the middle, e.g., without transverse torque, with a tool, especially when screwing the attachment shaft into the rotor shaft.

According to example embodiments, the second non-circular portion is an outer non-circular portion, e.g., an outer hexagonal portion. An advantage of this is that a simple tool can be used.

According to example embodiments, the first non-circular portion is formed on a screw, which is screwed into a threaded bore, e.g., an axial bore, of the attachment shaft. [[, For example, a washer or a perforated disk is arranged between the screw head of the screw and the attachment shaft. An advantage of this is that the non-circular portion can be provided by a screw. Thus, it is only necessary to make an axially oriented threaded hole in the attachment shaft and then screw in the screw.

According to example embodiments, the guide region is formed as the jacket surface of a circular cylinder. An advantage of this is that ready and cost-effective production can be implemented.

According to example embodiments, instead of the guide region and the cylindrical region that effects the centering fit, a conically shaped region is formed on the attachment shaft, which region is arranged axially between the threaded region of the attachment shaft and the second non-circular portion. For example, the outer diameter of the conical region increases monotonically, e.g., strictly monotonically, with decreasing distance from the second non-circular portion. An advantage of this is that very precise centering of the attachment shaft to the rotor shaft is possible.

According to example embodiments, the hollow shaft of the angle sensor is connected to the connection region of the attachment shaft in a force-locking manner, and a seal, e.g., a sealing ring such as an O-ring, is arranged between the hollow shaft and the second non-circular portion, which seals the hollow shaft towards the second non-circular portion. For example, the seal is arranged radially outside the connection region, i.e., for example, the radial distance region related to the axis of rotation of the rotor shaft and covered by the seal is at a distance from the radial distance region covered by the connection region and related to the axis of rotation of the shaft. For example, the seal bears against a finely machined end surface of the attachment shaft. For example, the end surface is flat and the normal of the end surface is oriented parallel to the axis of rotation of the rotor shaft. For example, the housing of the angle sensor is connected to a housing part, e.g., a fan hood, of the electric motor by means of a torque support. A shaft seal ring is accommodated in the housing of the angle sensor, which seals towards the hollow shaft, e.g., and a seal lip of the shaft seal ring bears against the radial outer circumference of the hollow shaft. An advantage of this is that the interior space of the angle sensor can be sealed towards the environment.

Further features and aspects of example embodiments of the present invention are explained in more detail with reference to the appended schematic Figures.

DETAILED DESCRIPTION

Figure 1:
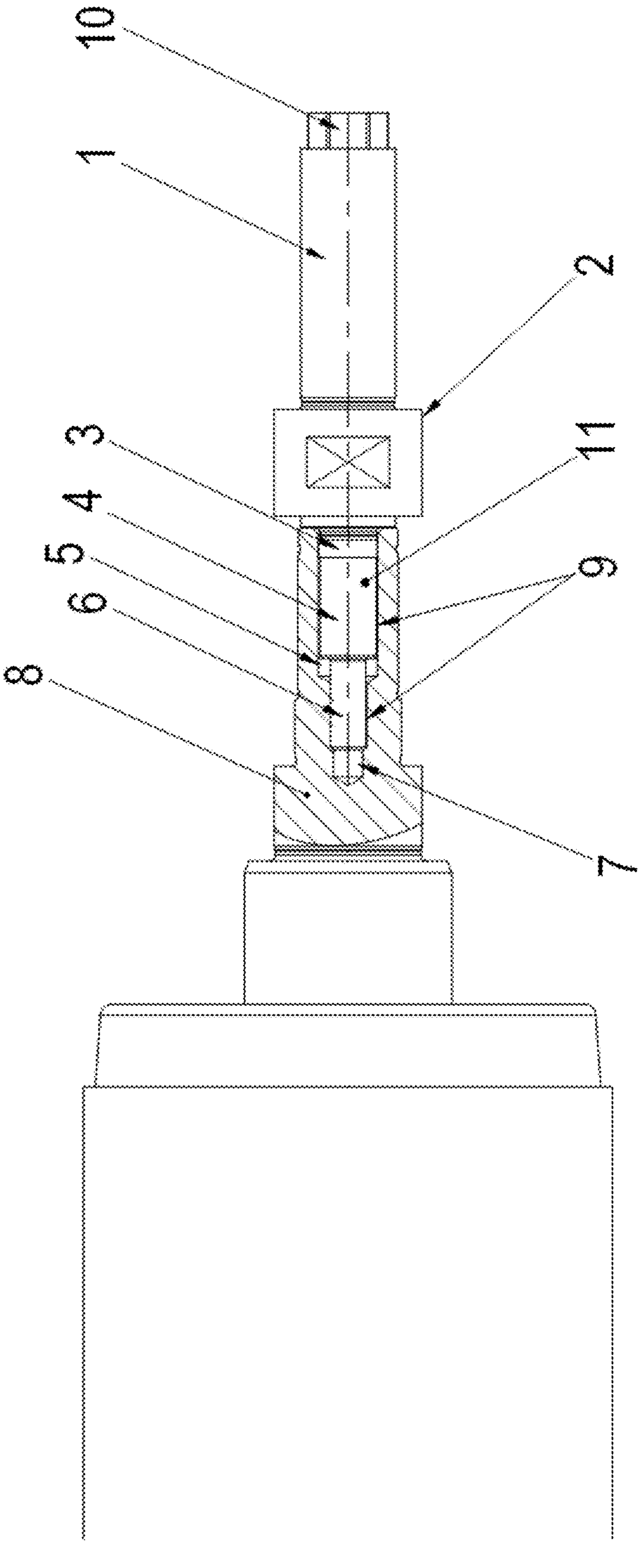
FIG. 1 is a cross-sectional view of an attachment shaft 11 connected to a rotor shaft 8 for connecting the rotor shaft 8 of a first electric motor to an angle sensor.

As illustrated in FIG. 1, the first electric motor has a rotor shaft 8 into which an attachment shaft 11 is screwed to provide for the attachment of an angle sensor, e. g., a hollow shaft encoder.

The rotor shaft has a stepped bore on its axial end region facing the angle sensor, e.g., on its axial end face. The attachment shaft 11 has a threaded region 6, which is adjoined by a cylindrical guide region 4. On the side of the cylindrical guide region 4 axially facing away from the threaded region 6 a further cylindrical portion of the attachment shaft 11 adjoins, which portion acts as a centering fit 3.

Before being connected to the rotor shaft 8, the threaded region 6 and the cylindrical guide region 4 are coated with adhesive 9, which can either emerge into a cavity 5 or into a thread run-out 7, which axially adjoins the threaded region 6 of the attachment shaft 11.

The stepped bore of the rotor shaft 8 has the thread run-out 7 as the innermost stepped portion, which is arranged axially next to an internal thread into which the threaded region 6 of the attachment shaft 11 is screwed.

Axially next to the internal thread, a further stepped portion of the stepped bore is arranged, which receives the guide region 4 of the attachment shaft 11 with play, e.g., with a clearance fit. The further stepped portion projects axially beyond the guide region 4, forming the cavity 5 into which adhesive 9 can enter.

The further cylindrical portion of the attachment shaft 11 has a larger diameter than the guide region 4 and is thus inserted without play, e. g., as a centering fit, into the further stepped portion of the stepped bore of the rotor shaft 8.

In this manner, when the attachment shaft 11 is inserted into the rotor shaft 8, guidance is initially achieved by the guide region 4 and, when the attachment shaft 11 is screwed in further, precise centering is achieved by the further cylindrical portion of the attachment shaft 11, which portion acts as a centering fit 3.

For applying a tool, the attachment shaft 11 has a first non-circular portion 10 at its axial end region facing away from the rotor shaft 8, so that the screwing torque of a tool can be applied centrally in the middle with little or no transverse force.

The first non-circular portion 10 can be arranged as an outer hexagonal region, as illustrated in FIG. 1, or as an inner hexagonal region.

Axially between the region 3, which acts as a centering fit, and the connection region 1, a second non-circular portion 2, e. g., with a width across flats, is formed on the attachment shaft 11. Thus, a further tool can be applied in this second non-circular portion 2 to provide for removal of the mounting shaft 11 with such a high torque that the material-locking connection is separated.

The attachment shaft 11 can also be referred to as an adapter shaft.

The largest outer diameter of the second non-circular portion 2 exceeds the largest outer diameters of the regions of the attachment shaft 11 received in the rotor shaft 8.

The inner ring of a roller bearing is fitted onto the rotor shaft 8, the outer ring of which roller bearing is received in a bearing flange. Axially between this bearing and the second non-circular portion, a fan can be fitted onto the rotor shaft 8 and connected for conjoint rotation with the rotor shaft, e. g., by a feather key connection. The largest outer diameter of the second non-circular portion 2 may even be larger than the smallest diameter of the fan, e.g., the clear inside diameter of the fan.

This is because the fan can be readily replaced by removal of the attachment shaft 11.

Figure 2:
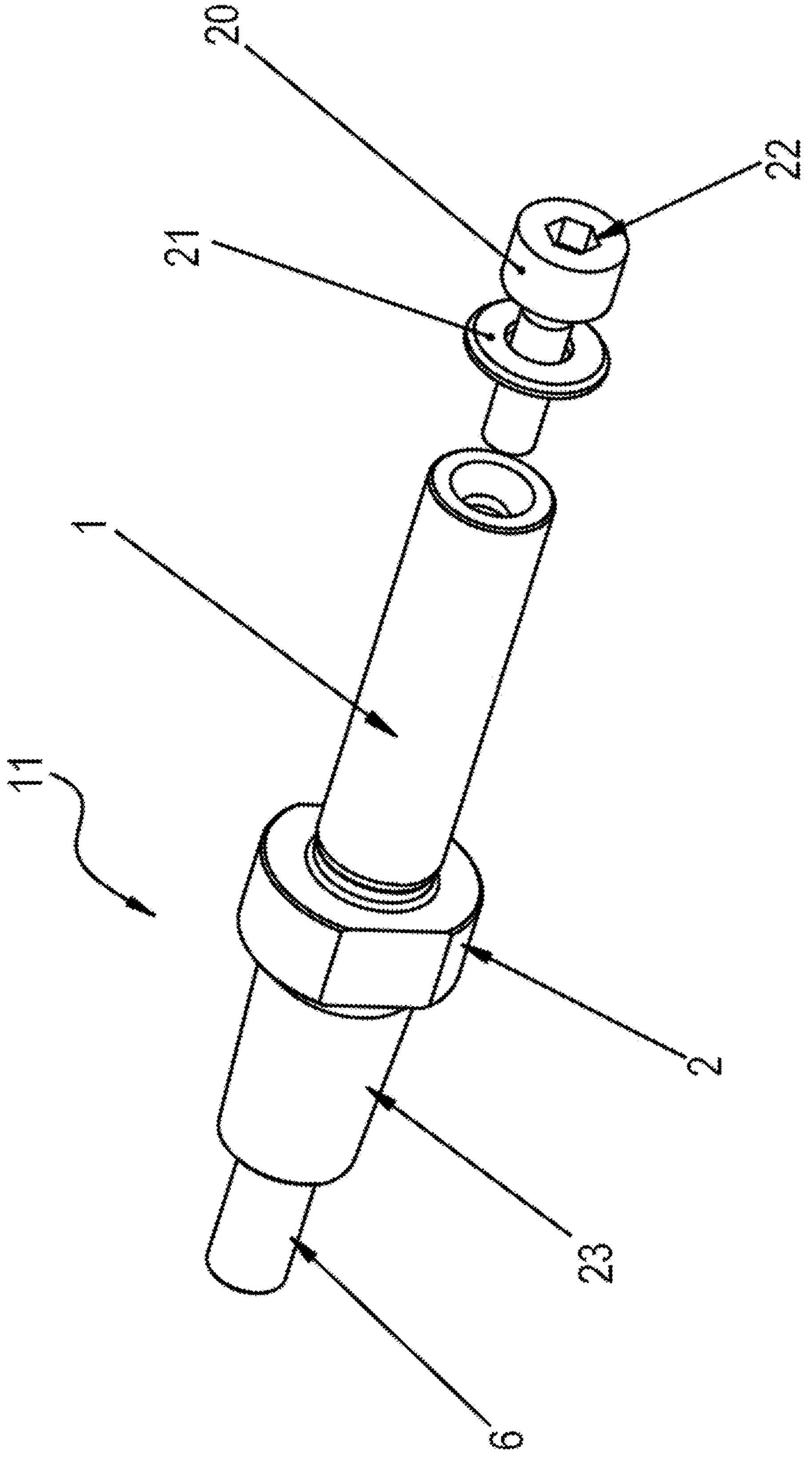
FIG. 2 illustrates the attachment shaft 11 of a second electric motor in an exploded perspective view, in which, in contrast to the arrangement illustrated in FIG. 1, the attachment shaft 11 has a conical instead of a cylindrical shaft portion and a screw 20 can be screwed in at the axial end of the attachment shaft 11.
Figure 3:
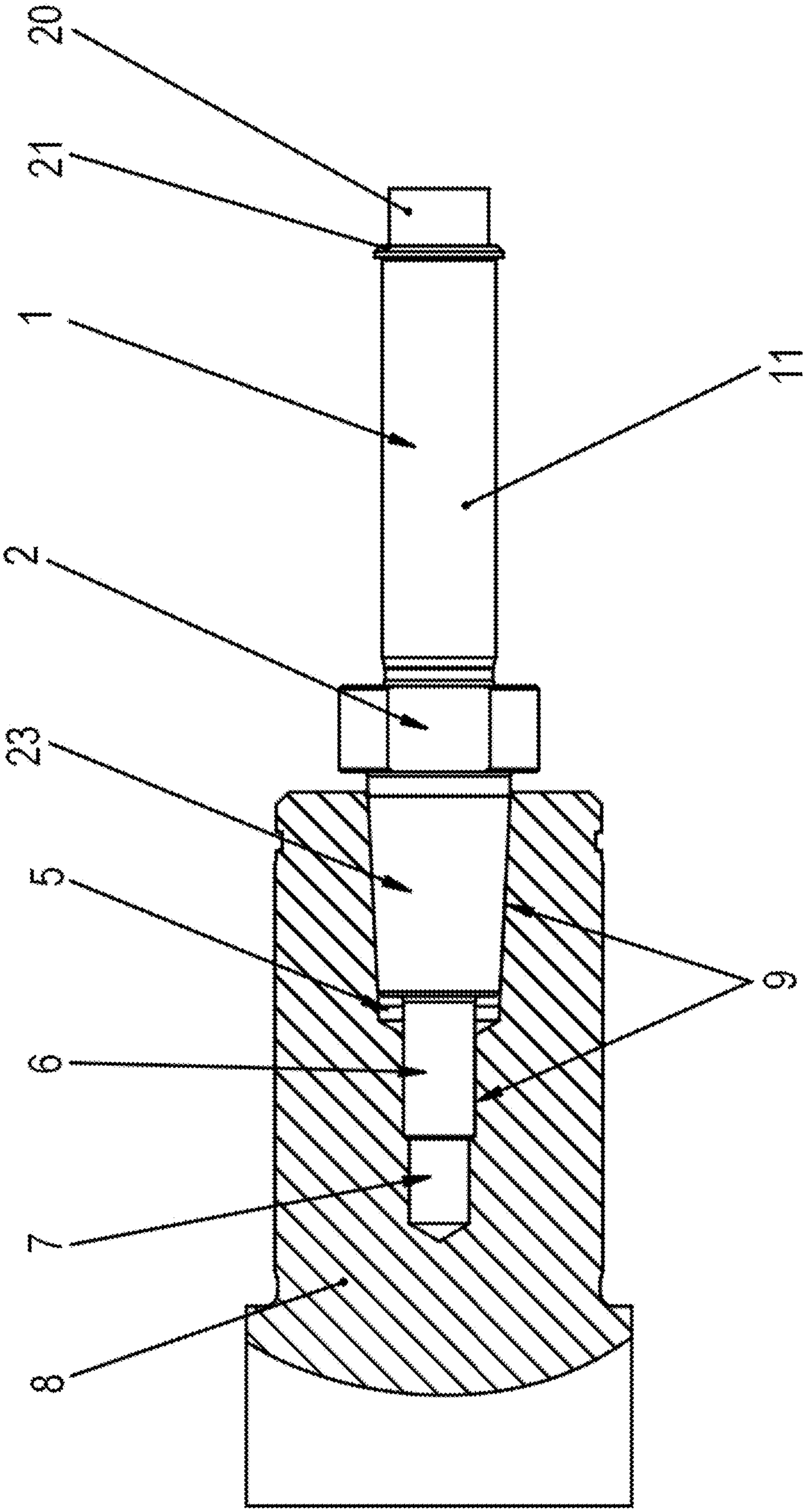
FIG. 3 is a cross-sectional view of the rotor shaft 8 with screwed-in attachment shaft 11.

As illustrated in FIGS. 2 and 3, instead of the first non-circular portion 10, a screw 20 can be screwed into a threaded bore of the adapter shaft 11, the screw head of which has an outer hexagonal region and/or an inner hexagonal region. An interposed perforated disk 21 protects the end face of the attachment shaft 11 facing the screw head of the screw 20. For example, the perforated disk 21 is arranged between the screw head of the screw 20 and the end face of the attachment shaft 11 facing the screw head of the screw 20.

Figure 4:
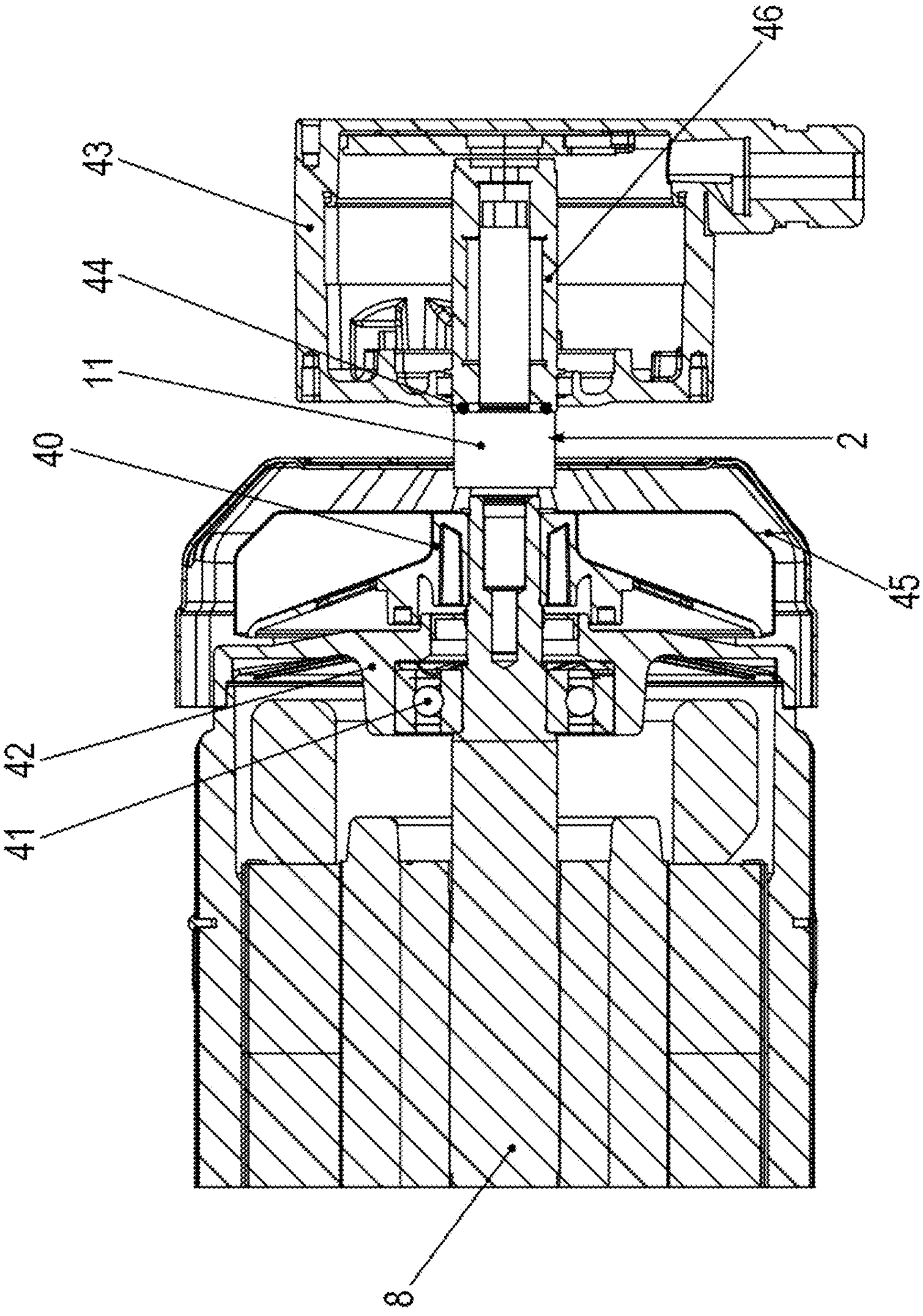
FIG. 4 is a cross-sectional view of the angle sensor attached to the first electric motor.

In addition, as illustrated in FIGS. 2 to 4, a conical connection region 23 is provided on the attachment shaft 11 instead of the cylindrical guide region 4 and instead of the region acting as a centering fit 3.

The stepped bore has a corresponding inner cone as a further stepped portion.

This achieves improved guidance and centering.

As illustrated in FIG. 4, a fan 40 is fitted onto the rotor shaft 8, which is connected for conjoint rotation with the rotor shaft 8 and has fan blades. The airflow generated by the fan is deflected by a fan hood 45, which is connected to the motor housing of the electric motor, so that the airflow flows along the motor housing.

The largest outer diameter of the second non-circular portion 2 is larger than the clear inside diameter of the fan 40.

The rotor shaft 8 is rotatably mounted via the bearing 41 received in the bearing shield 42.

The attachment shaft 11 can be removed using a tool that is attached to the second non-circular portion 2, so that the fan hood can also be removed and the fan 40 can be replaced after the attachment shaft 11 has been removed.

The fan 40 cannot be removed without removing the attachment shaft 11, as the clear inside diameter of the fan 40 is smaller than the largest outside diameter of the second non-circular portion 2.

A hollow shaft of the angle sensor is pushed onto the connection region 1 of the attachment shaft 11 and connected to such region for conjoint rotation.

Since the second non-circular portion 2 projects radially beyond the connection region 1, the hollow shaft can be tightly connected to the second non-circular portion 2 by means of a seal, e.g., a sealing ring, such as an O-ring, and thus the interior of the angle sensor, e. g., the hollow shaft encoder, is sealed off from the environment, since a shaft seal ring received in the housing of the angle sensor including the housing part 43 seals the housing towards the hollow shaft 46.

The hollow shaft 46 is arranged in the angle sensor so that it can rotate relative to the housing part 43.

The seal 44 is arranged radially outside the connection region 1, e.g., in relation to the axis of rotation of the rotor shaft 8.

The housing of the angle sensor is connected to the fan hood 45 by a torque support not shown in the Figures.

For example, instead of the outer hexagonal region or inner hexagonal region a polygonal region can also be used respectively in the first non-circular portion 10 and/or second non-circular portion 2.

List of Reference Numerals

1 Connection region
2 Second non-circular portion, e.g., width across flats
3 Centering fit
4 Cylindrical guide region
5 Cavity
6 Threaded region
7 Thread run-out
8 Rotor shaft
9 Adhesive
10 First non-circular portion, e.g., hexagonal
11 Attachment shaft
20 Screw
21 Perforated disk
22 Inner hexagonal
23 Connection region
40 Fan
41 Bearing
42 Bearing shield
43 Housing of the angle sensor, e.g., hollow shaft encoder
44 Seal
45 Fan hood
46 Hollow shaft

The invention claimed is:

1. An electric motor including an angle sensor, comprising:

a rotor shaft including a stepped bore an internally threaded region; and an attachment shaft connected to the rotor shaft, the attachment shaft including a threaded region, a guide region, a cylindrical portion adapted to provide a centering fit, a second non-circular portion, a connection region, and a first non-circular portion;

wherein the threaded region is screwed into the internally threaded region of the rotor shaft;

wherein a thread run-out region adjoins the internally threaded region of the rotor shaft; and wherein the guide region of the attachment shaft is received with play in the rotor shaft.

2. The electric motor according to claim 1, wherein the rotor shaft and the attachment shaft are connected for conjoint rotation.

3. The electric motor according to claim 1, wherein the thread run-out region adjoins the internally threaded region of the rotor shaft on a side of the internally threaded region axially facing away from the guide region, the guide region of the attachment shaft is received with a clearance fit in the rotor shaft, and the cylindrical adapted to provide the centering fit has a larger outer diameter than the guide region.

4. The electric motor according to claim 1, wherein the attachment shaft is connected for conjoint rotation with a hollow shaft of the angle sensor.

5. The electric motor according to claim 1, wherein a cavity is arranged axially between the guide region and the internally threaded region.

6. The electric motor according to claim 1, wherein adhesive is arranged between the rotor shaft and the guide region.

7. The electric motor according to claim 6, wherein adhesive escaping from the threaded region or the guide region is located in an annular cavity that is delimited radially inwardly by the threaded region and radially outwardly by the stepped bore of the attachment shaft.

8. The electric motor according to claim 1, wherein adhesive is arranged between the internally threaded region and the threaded region.

9. The electric motor according to claim 8, wherein adhesive that has escaped from the threaded region is located in the thread run-out region.

10. The electric motor according to claim 1, wherein the guide region adjoins the cylindrical portion adapted to provide the centering fit.

11. The electric motor according to claim 1, wherein the second non-circular portion is arranged axially between the cylindrical portion adapted to provide the centering fit and the connection region.

12. The electric motor according to claim 1, wherein a hollow shaft of the angle sensor is connected to the attachment shaft in the connection region.

13. The electric motor according to claim 1, wherein an elastic ring and/or an O-ring is arranged between the rotor shaft and the second non-circular portion.

14. The electric motor according to claim 13, wherein the elastic ring and/or the O-ring is arranged radially outside the cylindrical portion adapted to provide the centering fit and/or bears against an end face and/or an axial end face of the second non-circular portion facing away from the connection region and/or against an end face and/or an axial end face of the rotor shaft facing the second non-circular portion, and/or a ring axis of the elastic ring and/or the O-ring is oriented parallel to an axis of rotation of the rotor shaft.

15. The electric motor according to claim 1, wherein the first non-circular portion adjoins the connection region and/or adjoins the connection region on a side of the connection region axially facing away from the second non-circular portion.

16. The electric motor according to claim 1, wherein a fan is arranged on the rotor shaft and is connected for conjoint rotation with the rotor shaft, a region covered by the fan in an axial direction overlaps with or includes a region covered by the internally threaded region and/or thread run-out region in the axial direction.

17. The electric motor according to claim 16, wherein a clear inside diameter of the fan or an outside diameter of the rotor shaft in a region covered by the fan in a radial direction is smaller than a largest outside diameter of the second non-circular portion, and/or a largest outer diameter of the second non-circular portion is larger than a largest outer diameter of the connection region and than a largest outer diameter of the first non-circular portion.

18. The electric motor according to claim 1, wherein the first non-circular portion is an outer non-circular portion, an outer hexagonal portion, an inner non-circular portion, or an inner hexagonal portion, and/or the second non-circular portion is an outer non-circular portion or an outer hexagonal portion.

19. The electric motor according to claim 1, wherein the first non-circular portion is arranged on a screw screwed into a threaded bore and/or an axial bore of the attachment shaft, and a washer and/or a perforated disk is arranged between a screw head of the screw and the attachment shaft.

20. The electric motor according to claim 1, wherein the guide region is arranged as a jacket surface of a circular cylinder.

21. The electric motor according to claim 1, wherein a conically shaped region is arranged on the attachment shaft and is arranged axially between the threaded region of the attachment shaft and the second non-circular portion, an outer diameter of the conical region increases monotonically and/or strictly monotonically with decreasing distance from the second non-circular portion.

22. The electric motor according to claim 1, wherein the hollow shaft of the angle sensor is connected to the connection region of the attachment shaft in a force-locking manner, a seal is arranged between the hollow shaft and the second non-circular portion and seals the hollow shaft towards the second non-circular portion, the seal is arranged radially outside the connection region, the seal bears against a finely machined end surface of the attachment shaft that is flat and a normal of the end surface is oriented parallel to an axis of rotation of the rotor shaft, a housing of the angle sensor is connected to a housing part of the electric motor by a torque support, and a shaft seal ring is accommodated in the housing of the angle sensor and seals towards the hollow shaft, a seal lip of the shaft seal ring being against a radial outer circumference of the hollow shaft.

* * * * *